May 19, 1925.                                                    1,538,384
Q. M. CROCKETT ET AL
REMOVABLE COVER FOR TRUCK BODIES
Filed Sept. 11, 1922        2 Sheets-Sheet 1
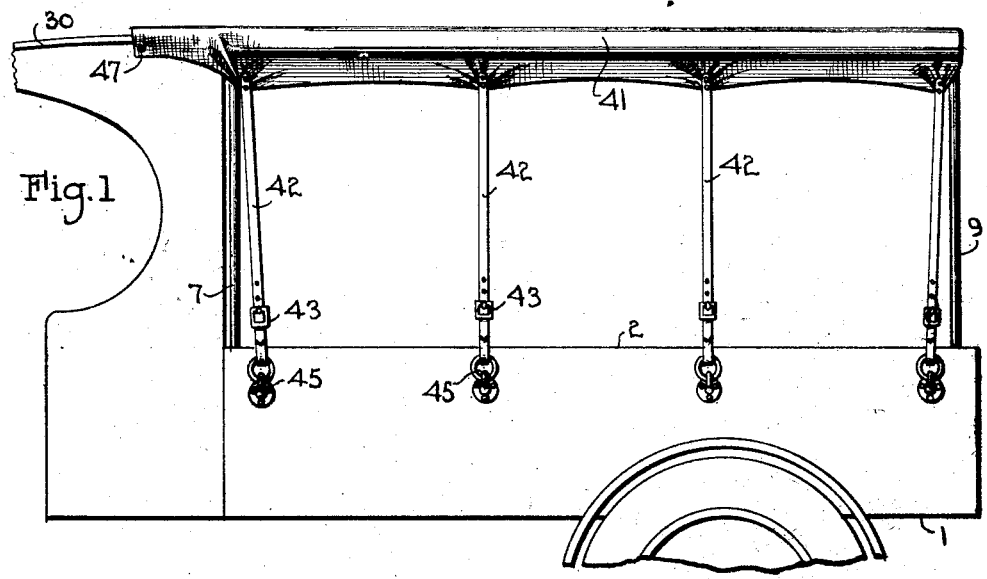
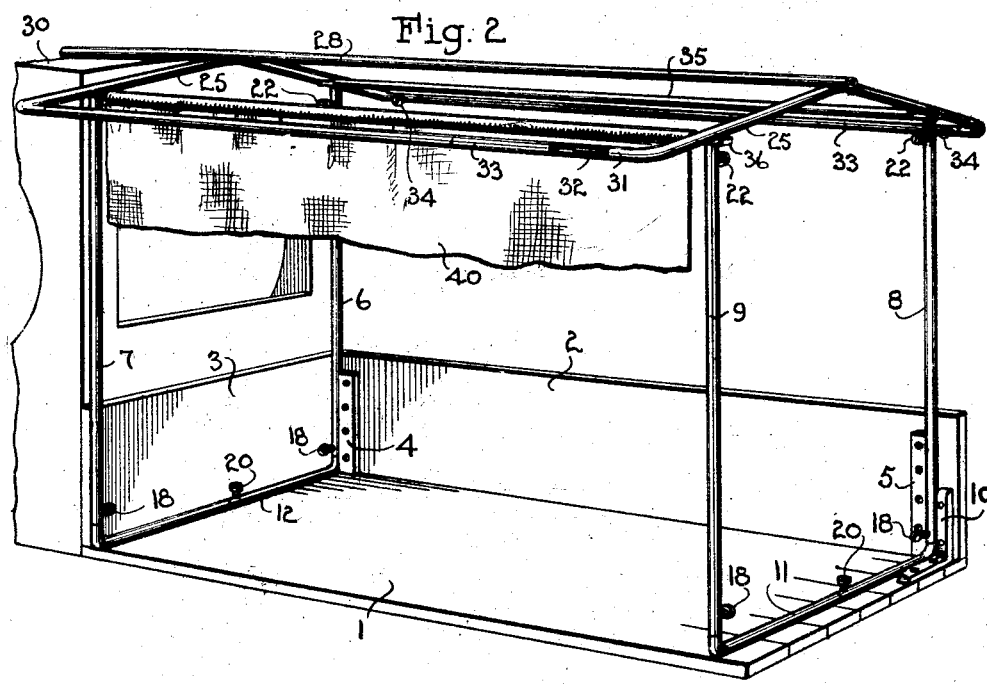

May 19, 1925.  1,538,384
Q. M. CROCKETT ET AL
REMOVABLE COVER FOR TRUCK BODIES
Filed Sept. 11, 1922  2 Sheets-Sheet 2

Q. M. Crockett
Oliver Day INVENTORS

WITNESSES
BY
ATTORNEY

Patented May 19, 1925.

1,538,384

UNITED STATES PATENT OFFICE.

QUINN M. CROCKETT AND OLIVER DAY, OF AUSTIN, TEXAS.

REMOVABLE COVER FOR TRUCK BODIES.

Application filed September 11, 1922. Serial No. 587,406.

*To all whom it may concern:*

Be it known that QUINN M. CROCKETT and OLIVER DAY, citizens of the United States, residing at Austin, in the county of Travis and State of Texas, have invented a new and useful Removable Cover for Truck Bodies, of which the following is a specification.

This invention relates to covers for vehicle bodies, and is more particularly directed to a removable cover for truck bodies.

The invention has for its object to provide a covering for a truck body supported by an adjustable frame which may be employed in connection with truck bodies having various lengths and widths, and which may be taken apart and stored in a small space when not in use.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is a side elevation of a truck body with our invention applied thereto.

Fig. 2 is a view in perspective of the supporting framework removably mounted on a truck body.

Figure 3:
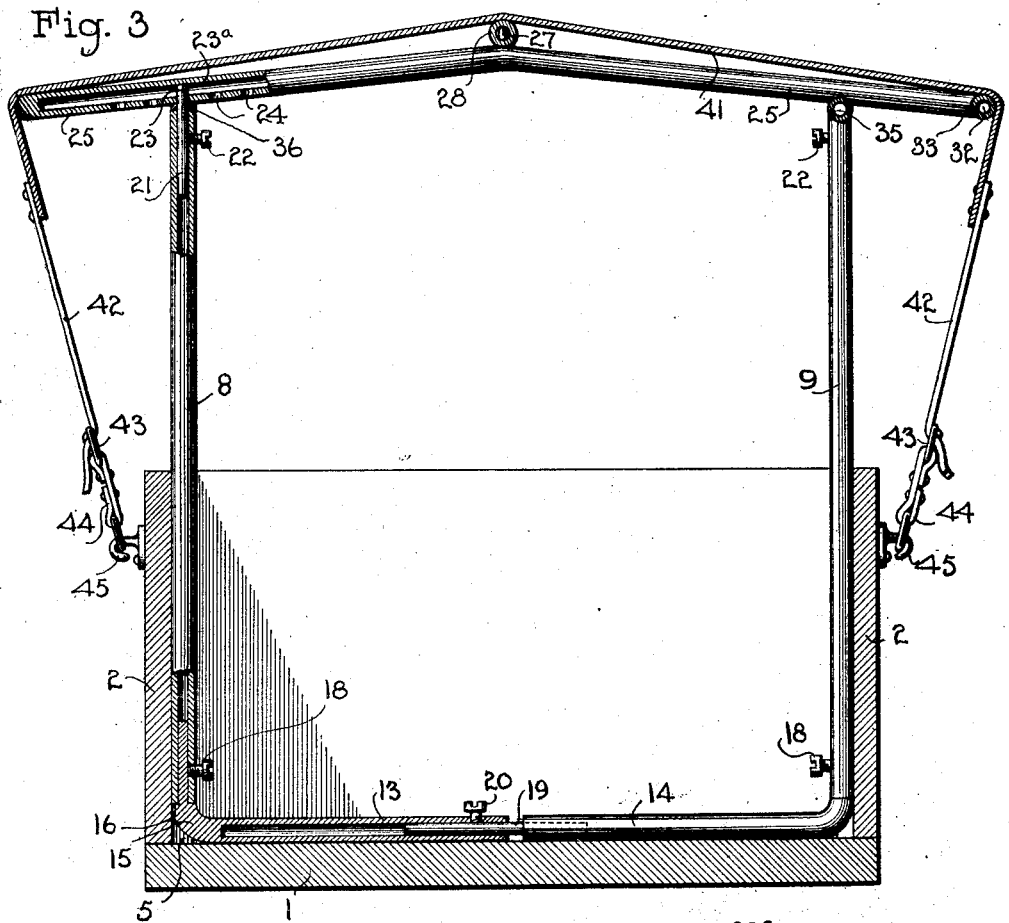
Fig. 3 is a transverse section of the removable frame and truck body disclosing the means for adjusting the frame widthwise of the body.

Referring to the drawings, 1 indicates the floor of a truck body, 2 the sides, and 3 the front end of the truck body and likewise the rear of the seat of said truck.

To the side members 2 of the truck body, adjacent their ends and on the inside of said body, are secured in a vertical position, strap irons 4 and 5. The irons 4 are spaced sufficiently from the rear of the front end 3 to provide a vertical passage for the front hollow posts 6 and 7. The irons 5 are sufficiently spaced from the rear ends of the side 2 to permit rear corner hollow posts 8 and 9 to be received between the irons 5 and an angle iron 10, which is secured not only to the side member 2 but likewise to the bottom 1 of the truck body. This angle iron normally forms a part of the truck body. Those portions of the angle irons 10 which are secured to the floor 1 of the truck body, are adapted to lie in engagement with the opposite ends of an adjustable bottom rest 11, and serve in cooperation with the irons 5, which hold the posts 8 and 9 against the upper portion of the angle irons 10, to maintain the bottom rest in position.

The bottom rest 12, which supports the lower ends of the front posts 6 and 7, is held against the lower edge of the back of the front end 3 by means of the lower ends of the irons 4.

Each of the bottom rests 11 and 12 is formed of cylindrical hollow members 13 and 14. As shown in Fig. 3, the members 13 and 14 of the rest 11, at their outer ends, are provided with a solid corner 15 having a shoulder 16, upon which the lower ends of the hollow posts 8 and 9 rest, with a pin or tenon 17 extending vertically upward and integrally formed to be received in the hollow lower ends of said posts. Set screws 18, mounted in the lower ends of the posts, are adapted to be screwed up tight into engagement with the pins 17 for maintaining the posts in rigid relation with the members of the bottom rests. The member 14 has a horizontal pin or tenon 19 extending outwardly from the inner end of said member and integrally formed or otherwise secured within said hollow member and adapted to be slidable within the hollow end of the member 13. A set screw 20 mounted in the inner end of the member 13 is adapted to be screwed up tight against the pin 19 for holding the members 13 and 14 in an adjusted position relatively to each other.

The front bottom rest 12 is constructed similarly to the rear bottom rest 11.

By means of the pin 19 and the set screw 20, the members 13 and 14 may be adjusted transversely of the truck body so that these bottom rests may be adapted for truck bodies of varying widths.

The provision of the pins 17 and the set screws 18 provide for vertical adjustment where truck bodies of varying heights are used. The hollow posts 6, 7, 8, 9 are provided at their upper ends with pins 21 slidable within the hollow posts and held in position by means of a set screw 22. The upper ends 23 of the pins 21 are adapted to be inserted within any one of a plurality of perforations 24 formed in the underside of end top rails 25, with the ends 23 of said pins in engagement with the inner wall 23ª of the hollow end rails 25, so that when the ends 23 of the pins are inserted within these perforations, the inner circular wall of the hollow member 25 will rest on the ends of the pins and thereby support said end rails in position. These perforations are located adjacent the ends of the end rails. (Fig. 3.)

We have provided a front and rear top end rail 25 which are similarly constructed and are bowed upwardly or bent midway between their ends, and are provided at their intermediate or most elevated points with upstanding pins 27 which may be welded to or screwed into the top end rails 25. The projecting end of the pin 27 is adapted to be received within a single perforation formed adjacent the forward end of a ridge pole 28, while the pin 27, mounted in the rear end rail, is adapted to be received within any one of a plurality of perforations 29 formed in the underside of the ridge pole 28 adjacent the rear end of said pole, as shown in Fig. 3, and more particularly in Fig. 4. The inner wall 28ª of the hollow ridge pole 28 is adapted to rest on the upper end of the pins 27 when the said pins are inserted through the perforations at the opposite ends of said ridge pole. The series of perforations 29 at the rear end of the ridge pole provides for adapting the frame to truck bodies of various lengths.

As shown in Fig. 2, the ridge pole projects at its rear end slightly beyond the top end rail 25, while the forward end of the ridge pole projects sufficiently beyond the forward top end rail to rest on the top 30 located above the seat of the truck.

The ends of the top end rails 25 are formed in a manner similar to the ends of the bottom rests 11 and 12, and have a solid portion 31 with an integrally formed pin 32 extending longitudinally of the frame and projecting into the hollow ends of top side rails 33. A set screw 34, mounted in the opposite ends of the side rails 33, is adapted to be screwed into engagement with the pin 32 and maintain the side rails 33 in rigid relation with the end rails 25.

By means of the pins 32 and the set screws 34, a longitudinal adjustment of the top of the frame may be had when the frame is adapted to be applied to truck bodies of various lengths.

When it is desired to employ side curtains, curtain rails 35 are mounted longitudinally of the truck body and supported on the upper ends of the corner posts 6, 7, 8 and 9. The opposite ends of the curtain rails 35 are flattened as shown at 36, and perforated to receive the pins 21, with the flattened ends 36 located between the extreme upper ends of the posts and the end rails 25.

Figure 4:
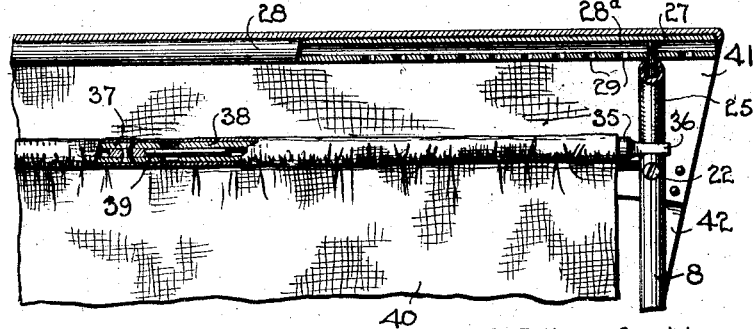
Fig. 4 is a side elevation partly in section disclosing the longitudinal adjustability of the frame.

As shown in Fig. 4, the curtain rails each comprise two hollow sections 37 and 38 with a pin 39 rigidly secured on the inner end of the section 37, and with its other end slidable in the hollow end of the section 38. If so desired, a set screw may be mounted in the end of the section 38 to be screwed up tight against the slidable end of the pin 39 for locking the sections of the curtain rails together. Otherwise, the fitting of the pin 39 in the hollow end of the section 38 of the curtain rail will be sufficient to maintain the sections of the curtain rail in rigid relation, since the ends of the curtain rail are firmly held in position on the pins 21 and between the upper ends of the posts and the end rails 25.

The curtain 40 having one end secured to the curtain rail 35, is adapted to be rolled on said rail when not in use, or suspended from the same when employed for closing the sides of the truck body. If it be desired to dispense with the side curtains at any time, the rails may be removed from their position on the tops of the posts and stored away.

As shown in Figs. 1 and 3, a canvas covering 41 is adapted to be stretched transversely over the top frame, and in engagement with the ridge pole 28 and the top side rails 33, with its longitudinal ends held taut by means of straps 42 which are connected to buckles 43 having a link connection 44 with hooks 45. The hooks are rigidly secured in spaced relation to each other and to the outer wall of the side members 2 of the truck body. By the adjustment of the straps 42 in the buckles 43, the canvas covering 41 may be stretched to the degree desired.

The forward end of the canvas covering is adapted to overlap the top 30 located above the seat, and secured at opposite ends by means of a button 47 to the sides of the seat structure. If so desired, a curtain rail and curtain similar to the side curtains may be applied to the rear of the frame for closing the end of the truck body.

From an inspection of Figs. 2 and 3, it will be seen that the top end rails 25 are of a length to extend beyond the pairs of front and rear posts 6, 8 and 7, 9, so that the canvas covering 41 is located in overhanging relation with the truck body. The ends of the top end rails 25 are only extended beyond the sides of the truck body a sufficient distance to fall within a vertical plane passing through the hubs of the wheels.

By releasing the straps 42 from their connection with the hooks 45 on the truck body, the canvas covering 41 may be removed, The top frame comprising the top end rails 25, the top side rails 33 and the ridge pole 28, may then be released from their position on the corner posts 6, 7 and 8, 9. By releasing the set screws 34, the top side rails 33 will be released from the top end rails 25. The curtain rails 35 are then removed by raising said rails sufficiently for their ends 36 to clear the pins 21 secured in the upper ends of the corner posts.

By loosening the set screws 18 in the lower ends of the respective posts, the posts may be removed from the bottom rests, while the rests 11 and 12 may be removed by raising them sufficiently to clear the upper ends of the irons 4 and 5. The corner posts, the side rails, the end rails, the ridge pole, the bottom rests and the curtain rails may be securely tied together to form a neat and compact bundle for storing the framework when it is not desired to use the cover for the truck body.

It will be seen that all parts of the framework are adapted to be removed from the truck body so that no upstanding or projecting members remain to interfere with the use of the truck body when the top is not employed.

When camping, or on a fishing trip, the frame and covering may be removed from the truck and set up on the ground and used as a tent.

The frame and covering may be set up by one person in a few minutes.

What is claimed is:—

1. In a cover for truck bodies, a frame comprising a plurality of spaced corner posts, longitudinally adjustable bottom rests extending across the bottom of the truck body on the inside thereof, pins carried by the ends of the bottom rests and fitted in the lower ends of the corner posts, fastening means for the pins, top end rails at each end of the structure having perforations in the underside thereof, pins mounted in the upper ends of the corner posts to selectively engage said perforations, a cover stretched over the frame and serving to retain the end rails against movement from the last-mentioned pins, and means at each side of the cover for connecting the same to the truck in stretched relation.

2. In a device of the class described, a frame comprising a plurality of spaced posts, means for maintaining them in upright position, pins carried by the upper ends of said posts and projecting above the same, hollow top end rails at each end of the structure, said end rails having a series of perforations formed only in the bottom wall thereof, said perforations selectively receiving said pins, the upper ends of which engage the top wall of said end rails and support the end rails in position.

3. In a cover for truck bodies, the combination of a plurality of spaced corner posts, top end rails at each end of the frame, means connecting the corner posts to intermediate portions of the top end rails, and curtain rails having their ends clamped between the corner posts and the top end rails and held in place by the said connecting means.

4. In a cover for truck bodies, the combination of a plurality of hollow corner posts, pins secured within the corner posts at their upper ends, top end rails at each end of the frame, said top end rails being provided with a plurality of perforations, and curtain rails having their ends interposed between the top of the corner posts and the underside of the top end rails and secured thereto by the said pins.

5. In a cover for truck bodies, a frame comprising a plurality of spaced corner posts, means for supporting the posts in upright position within the truck body, top end rails resting on the upper ends of the posts at points remote from each end and having inturned ends, means for preventing horizontal movement of the top end rails with respect to the posts, top side rails having end sockets receiving the inturned ends of the top end rails and arranged in overhanging relation to the sides of the truck body, a ridge pole extending longitudinally across the top end rails and connected thereto, a covering adapted to be stretched over the ridge pole, the top end rails and the top side rails to retain the same against removal from the upper ends of the corner posts, and means for connecting the covering to the truck body to maintain it in stretched condition.

6. In a cover for truck bodies, a frame comprising a plurality of spaced corner posts, means for supporting the posts in upright position, top end rails at each end of the frame, means for connecting the corner posts at their upper ends to the top end rails at points short of the outer ends of the latter, so as to provide for the extension of the top end rails beyond the posts, top side rails detachably connected to the ends of the top end rail rails, whereby the top end rails and the top side rails combine to form a top frame which overhangs the sides of the truck body, a ridge pole supported on the top end rails and overhanging the front of the truck body, a covering extending over the ridge pole, over the front of the body, and over the top end rails and top side rails, and means for connecting the sides of the covering to the sides of the truck body.

7. In a cover for truck bodies, a frame comprising a plurality of spaced corner posts, means for supporting the posts in an upright position within the truck body, top end rails at each end of the frame, means for adjustably connecting the upper ends of the corner posts to the top end rails, top side rails, means for detachably connecting the top side rails to the ends of the top end rails, and extensible curtain rails having their ends clamped between the top end rails and corner posts.

8. In a cover for truck bodies, a frame comprising a plurality of spaced corner posts, means for supporting the posts in an upright position within the truck body, top end rails at each end of the frame, means for adjustably connecting the upper ends of the corner posts to the top end rails, top side rails, means for detachably connecting the top side rails to the ends of the top end rails, and longitudinally extensible curtain rails mounted on the corner posts and secured to the latter by the same means which connect the corner posts to the top end rails.

9. In a cover for truck bodies, a frame comprising a plurality of hollow corner posts, longitudinally adjustable bottom rests, integrally formed pins projecting upwardly from the ends of the bottom rests and adapted to be received by the lower ends of the hollow corner posts for supporting the posts in an upright position, top end rails provided with a plurality of perforations adjacent their ends, pins adjustably mounted in the upper ends of the corner posts adapted to be received by certain perforations in the top end rails, whereby the end rails are supported on the posts, top side rails adapted to be removably connected to the ends of the top end rails and supported in laterally spaced relation with the pairs of the corner posts, curtain rails longitudinally extensible and having perforated ends adapted to receive the adjustable pins at the upper ends of the corner posts, with the ends of the curtain rails seated between the upper ends of the posts and the top end rails, and a depending curtain on each curtain rail.

10. The combination with a truck body and a removable frame comprising a plurality of spaced corner posts, means for supporting the corner posts in an upright position, top end rails provided with spaced recesses adjacent their ends for selectively connecting said top end rails in supported relation with the posts, said top end rails having their ends projecting beyond the posts, top side rails connected to the ends of the top end rails and supported in overhanging relation with pairs of the posts, a ridge pole provided with means for adjustably positioning the pole on the top end rails, a covering adapted to be stretched over the ridge pole, top end rails and the top side rails, spaced straps secured to the covering, and means on the sides of the truck body for engaging the straps for securely retaining the frame and covering on the truck body.

11. In a cover for truck bodies, the combination of a frame comprising a plurality of spaced vertical posts, top end rails, one at each end of the frame for each pair of posts, means for connecting the corner posts at their upper ends to the top end rails at points short of the outer ends of the latter, so as to provide for the extension of the top end rails beyond the posts, the outer ends of the top end rails being turned laterally toward each other, top side rails detachably connecting the laterally turned ends of the top end rails, whereby the top end rails and the top side rails combine to form a top frame which overhangs the sides of the truck body, a covering extending over said top frame and depending from the sides of the same, and means for connecting the sides of the covering to the sides of the truck body.

In testimony that we claim the foregoing as our own, we have hereto affixed our signatures.

QUINN M. CROCKETT
OLIVER DAY.